(12) United States Patent
Ito (10) Patent No.: US 6,606,551 B2
(45) Date of Patent: Aug. 12, 2003

(54) MALFUNCTION DETERMINING APPARATUS OF ENGINE SYSTEM

(75) Inventor: Tokiji Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 279 days.

(21) Appl. No.: 09/866,802

(22) Filed: May 30, 2001

(65) Prior Publication Data

US 2001/0051848 A1 Dec. 13, 2001

(30) Foreign Application Priority Data

Jun. 8, 2000 (JP) ........................................ 2000-171736

(51) Int. Cl.⁷ .............................................. G06G 19/00
(52) U.S. Cl. ......................................................... 701/114
(58) Field of Search ................................. 701/114, 110, 701/115, 102

(56) References Cited

U.S. PATENT DOCUMENTS 4,245,315 A * 1/1981 Barman et al. ............. 701/114
4,797,828 A * 1/1989 Suzuki et al. ............... 701/114

FOREIGN PATENT DOCUMENTS

JP          A 7-36727          2/1995

* cited by examiner

*Primary Examiner*—Hieu T. Vo
(74) *Attorney, Agent, or Firm*—Oliff & Berridge, PLC (57) ABSTRACT

A malfunction determining apparatus of an engine system that has an improved malfunction determining accuracy. The apparatus includes a processing unit. The processing unit performs a test for the engine system every time a predetermined condition is satisfied and determines whether there is a malfunction in the engine system based on the test result. The number of times when a malfunction is detected is represented by malfunction counter value. The processing unit evaluates the reliability of malfunction counter value based on a normality counter value. When the malfunction counter value is reliable and reaches a predetermined value, the processing unit determines that there is a malfunction in the engine system.

20 Claims, 7 Drawing Sheets

MALFUNCTION DETERMINING APPARATUS OF ENGINE SYSTEM

BACKGROUND OF THE INVENTION

The present invention relates to an engine system, more particularly, to a malfunction determining apparatus of engine system.

A typical vehicle engine system has a malfunction determining apparatus, or a self-testing apparatus, for determining a malfunction in the system. To improve the determination accuracy, the malfunction determining apparatus consecutively performs malfunction tests. If the apparatus detects a malfunction in a predetermined number of times of the test, the apparatus determines that the system is malfunctioning.

During a so-called short trip, in which the engine is stopped relatively early after being started, the malfunction test is performed only limited times. The engine may be stopped before the number of times of test in which a malfunction is detected reaches a predetermined number. Therefore, even if a malfunction is detected in each of consecutive short trips, the malfunction determining apparatus cannot determine a malfunctioning or determines a malfunctioning after a time lag. Particularly, in an engine system that performs so-called economy running, in which an engine is automatically stopped and restarted, each running time of the engine can be significantly short. Thus, the above disadvantage is pronounced.

Japanese Unexamined Patent Publication No. 7-36727 discloses an engine system that maintains the number of times of malfunction test in which a malfunction is detected. Specifically, the system of the publication maintains the number of detected malfunctions after the engine is stopped and accumulates the maintained number over several running periods. If short trips are repeated, a malfunction is reliably determined when the accumulated number of detected malfunctions reaches a predetermined number.

However, accumulating the number of detected malfunctions over several running periods may lower the accuracy of the malfunction determination. That is, erroneously detected malfunctions are counted as detected malfunctions even if the erroneous detection is relatively scarce and accidental. If the number of erroneously detected malfunctions is accumulated for an extended period and the number of detected malfunctions reaches a predetermined number, the system is erroneously determined to have a malfunction. Accordingly, the accuracy of the malfunction determination is lowered.

BRIEF SUMMARY OF THE INVENTION

Accordingly, it is an objective of the present invention to provide a malfunction determining apparatus of an engine system that accurately determines a malfunction.

To achieve the foregoing and other objective and in accordance with the purpose of the present invention, an apparatus for determining the state of an engine system is provided. The apparatus includes a processing unit and a memory. The processing unit includes determining means, first counter means and second counter means. The detecting means detects whether there is a malfunction in the engine system every time a predetermined condition is satisfied. The first counter means generates a first counter value by counting the number of times when the detecting means detects a malfunction. The second counter means generates a second counter value for evaluating the reliability of the first counter value. The memory is connected to the processing unit and stores the first and second counter values regardless of whether the engine is stopped. The processing unit further includes determining means. The determining means evaluates the reliability of the first counter value based on the second counter value. When the first counter value is reliable and reaches a predetermined value, the determining means determines that there is a malfunction in the engine system.

The present invention may also be embodied in a method for determining the state of an engine system. The method includes detecting whether there is a malfunction in the engine system every time a predetermined condition is satisfied, generating a first counter value by counting the number of times when a malfunction is detected in the detecting step, generating a second counter value for evaluating the reliability of the first counter value, storing the first and second counter values in a memory, wherein the memory maintains the first and second counter values regardless of whether the engine is stopped, evaluating the reliability of the first counter value based on the second counter value, and determining that there is a malfunction in the engine system when the first counter value is reliable and reaches a predetermined value.

Other aspects and advantages of the invention will become apparent from the following description, taken in conjunction with the accompanying drawings, illustrating by way of example the principles of the invention.

BRIEF DESCRIPTION OF THE SEVERAL VIEWS OF DRAWING

The invention, together with objects and advantages thereof, may best be understood by reference to the following description of the presently preferred embodiments together with the accompanying drawings in which.

DETAILED DESCRIPTION OF THE PREFERRED EMBODIMENTS

A malfunction determining apparatus of an engine system 90 according to a first embodiment of the present invention will now be described with reference to FIGS. 1 to 3. The malfunction determining apparatus determines a malfunction of the engine system 90 when idle speed control is being executed.

Figure 1:
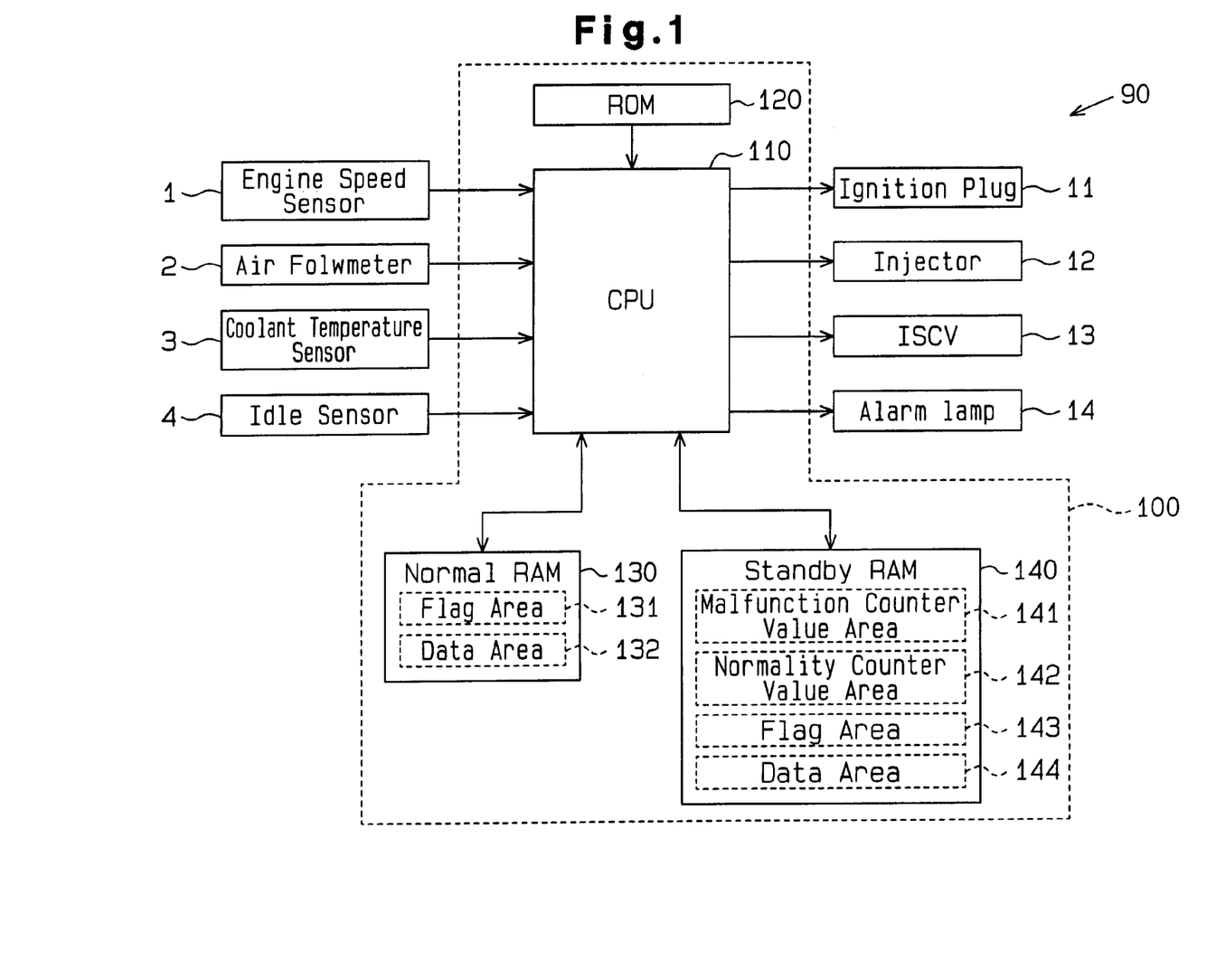
FIG. 1 is a schematic block diagram illustrating a malfunction determining apparatus according to a first embodiment of the present invention.

As shown in FIG. 1, the engine system 90 includes an engine speed sensor 1 for detecting the speed of the engine (not shown), an air flowmeter 2 for detecting the amount of intake air drawn into the engine, a coolant temperature sensor 3 for detecting the temperature of the engine coolant, an idling sensor (idle switch) 4 for detecting that an acceleration pedal (not shown) is not depressed, or that an throttle valve (not shown) is fully closed. The sensors 1 to 4 detect the running state of the engine.

The sensors 1 to 4 are connected to a malfunction determining apparatus, which is an electronic control unit (ECU) 100 in this embodiment. The ECU 100 is connected to various actuators. The actuators include an ignition plug 11 for igniting air-fuel mixture in a combustion chamber, an injector 12 for supplying fuel to the combustion chamber, and an idle speed control valve (ISCV) 13 for adjusting the amount of intake air when the engine is idling. The actuators, or the plug 11, the injector 12 and ISCV 13, control the running state of the engine. The ECU 100 is also connected to an alarm lamp 14. When a malfunction of the engine system 90 is determined, the lamp 14 is lit notify the passengers of the malfunction.

The ECU 100 detects the running state of the engine based on sensor output signals from the sensors 1 to 4 and actuates the actuators, accordingly, to control the running state of the engine. Also, the ECU 100 monitors the state of the engine system 90 according to signals from the sensors 1 to 4 for determining the state of the engine system 90.

The ECU 100 includes a central processing unit (CPU) 110, a read only memory (ROM) 120, a normal random access memory (normal RAM) 130 and a standby random access memory (standby RAM) 140. The ROM 120 stores various programs for controlling the running state of the engine and a program for determining a malfunction. The normal RAM 130 and the standby RAM 140 store the running state obtained by the CPU 110 based on sensor output signals and the results of computations regarding control procedures and tests for the engine.

The normal RAM 130 has a flag area 131 for storing the values of various flags and a data area 132 for storing data. Information stored in the flag area 131 and the data area 132 is maintained only when the ECU 100 is supplied with power. When the engine is stopped and providing of power to the ECU 100 is stopped, the information is erased. In other words, information stored in the normal RAM 130 is maintained in the current trip and is erased in the subsequent trip.

The standby RAM 140 has a malfunction counter value area 141 and a normality counter value area 142, a flag area 143, and a data area 144. The malfunction counter value area 141 stores a malfunction counter value counted by the CPU 110, which represents the number of times of malfunction tests in which a malfunction is detected. The flag area 143 stores a flag that is used in malfunction tests. The data area 144 stores data such as learned values used in various control procedure of the engine. The standby RAM 140 is always supplied with power from a power source (not shown) such as a battery. Information stored in the areas 141 to 144 is maintained even if providing of power to the ECU 100 is stopped. In other words, information stored in the standby RAM 140 is maintained when the engine is stopped and is carried over to the next trip.

An idle speed control procedure of the engine system 90 and a malfunction determination procedure in the idle speed control procedure will now be described.

The idle speed control procedure refers to a control of the idling speed of the engine. That is, when the throttle valve (not shown) is fully closed, the CPU 110 feedback controls the engine speed. Specifically, the CPU 110 changes the opening of the ISCV 13 for adjusting the amount of intake air such that the actual engine speed matches with a target speed.

When there is a malfunction in the idle speed control procedure, the actual engine speed does not match the target speed. The CPU 110 determines whether there is a malfunction in the idle speed control procedure based on the difference between the actual engine speed and the target engine speed.

A malfunction determination routine will now be described.

If the actual engine speed is significantly different from the target speed during the idle speed control procedure, there might be a malfunction, for example, of the ISCV 13. If the difference between the actual speed and the target speed is equal to or greater than a predetermined value when a predetermined period has elapsed after the idle speed control procedure is started, the CPU 110 detects a malfunction of the engine system 90. When detecting a malfunction, the CPU 110 increments the malfunction counter value. The CPU 110 then replaces the malfunction counter value stored in the malfunction counter value area 141 of the standby RAM 140 with the incremented value. When the malfunction counter value, or the number of times of test in which a malfunction is detected, reaches a predetermined threshold value, the CPU 110 determines that the system 90 has a malfunction.

In this manner, the number of times of test in which a malfunction is detected, or the accumulated number of detected malfunctions, is stored in the standby RAM 140. Generally, the engine idles for a limited period at a time. In other words, the idle speed control procedure lasts for a limited period. In such a short period, the CPU 110 performs the malfunction test. Based on the accumulated number of detected malfunctions, the CPU 110 reliably determines a malfunction of the engine system 90. That is, even if short trips in each of which the number of detected malfunctions does not reach the threshold value are repeated, the malfunction counter value is accumulated over the trips. Therefore, the malfunction detected in each trip is not wasted but is used for reliably and quickly determining a malfunction of the system 90.

When determining that the actual engine speed is substantially equal to the target engine speed, the CPU 110 detects that the idle speed control procedure is normal. Every time determining that the idle speed control procedure is normal, the CPU 110 increments a normality counter value and replaces the normality counter value stored in the normality counter value area 142 of the standby RAM 140 with the incremented value. When the normality counter value, or the number of times in which the idle speed control procedure is determined to be normal, reaches a predetermined threshold value, the CPU 110 determines that the malfunction counter value is unreliable and resets the malfunction counter value to an initial value, or zero. During a single idling period, the CPU 110 detects whether the idle speed control is normal or abnormal once.

In the present invention, the reliability of the malfunction counter value is evaluated based on detection results that indicate that the system 90 is normal. Further, the reliability of the normality counter value is evaluated based on the malfunction counter value. That is, a malfunction of the system 90 is determined while the reliability of the normality counter value and the malfunction counter value are evaluated based on each other. The reliability of the normality counter value is evaluated for the following reasons. Suppose that the normality counter value is accumulated and approaches the threshold value over several trips and a control system of the idle speed control procedure malfunctions. In this case, the malfunction counter value is accumulated every time the malfunction is detected. However, if the normal state of the system is erroneously detected and the normality counter value reaches the threshold value, the malfunction counter value is reset to zero. As a result, the malfunction is determined after a delay. To prevent such drawbacks, the normality counter value is reset to zero when the malfunction counter value reaches the predetermined threshold value.

The malfunction determination routine will now be described with reference to FIG. 2. The CPU 110 executes the malfunction determination routine of FIG. 2 according to a control program stored in the ROM 120 as an interruption routine every predetermined period.

In step S100, the CPU 110 determines whether a malfunction test condition is satisfied. The CPU 110 determines that the malfunction test condition is satisfied when the output signal of the idle sensor 4 is rising and a predetermined period has elapsed after the idle speed control procedure is started.

When determining that the malfunction test condition is satisfied, the CPU 110 proceeds to step S110 and performs malfunction detection based on the difference between the actual engine speed and the target engine speed. If the difference exceeds a predetermined value, the CPU 110 detects a malfunction and proceeds to step S120. In step S120, the CPU 110 increments the malfunction counter value.

In a subsequent step S130, the CPU 110 determines whether the malfunction counter value is equal to or greater than a predetermined value $\alpha$. The value $\alpha$ is a reference value for evaluating the reliability of the normality counter value. If the malfunction counter value is equal to or greater than the value $\alpha$, a malfunction is likely to exist and the accumulated normality counter value is evaluated to be unreliable.

If the malfunction counter is equal to or greater than the value $\alpha$ in step S130, a malfunction is likely to exist and the reliability of the normality counter value is low. In this case, the normality counter value is reset to zero in step S140.

In step S150, the CPU 110 determines whether the malfunction counter value is equal to or greater than a predetermined value $\beta$. The value $\beta$ is a reference value for determining whether there is a malfunction in the control system that performs the idle speed control procedure. The value $\beta$ is greater than the value $\alpha$. If the malfunction counter value is greater than the value $\beta$, the CPU 110 proceeds to step S160. In step S160, the CPU 110 determines that there is a malfunction in the idle speed control procedure. In this case, the CPU 110 lights the alarm lamp 14 to notify the passengers of the malfunction and terminates the malfunction determination routine. Also, the CPU 110 terminates the routine when the malfunction test condition is not satisfied in step S100, when the malfunction counter value is less than the value $\alpha$ in step S130 and when the malfunction counter value is less than the value $\beta$ in step S150.

If no malfunction is detected in step S110, the CPU 110 proceeds to step S170 and detects whether the state of the system is normal based on the difference between the actual engine speed and the target engine speed. That is, if the difference is less than a predetermined value and the actual engine speed is substantially equal to the target engine speed, the CPU 110 determines that the control system is normal. In this case, the CPU 110 proceeds to step S180 and increments the normality counter value.

In step S190, the CPU 110 determines whether the normality counter value is equal to or greater than a predetermined value $\gamma$. The value $\gamma$ is a reference value for evaluating the reliability of the malfunction counter value. If the normality counter value is equal to or greater than the value $\gamma$, the CPU 110 determines that the accumulated malfunction counter value is unreliable and proceeds to step S200. In step S200, the CPU 110 resets the malfunction counter value and the normality counter value to zero.

After executing step S200, the CPU 110 terminates the malfunction determination routine. The CPU 110 also terminates the routine when the system is not determined to be normal in step S170 and when the malfunction counter value is less than the value $\gamma$ in step S190.

Figure 3:
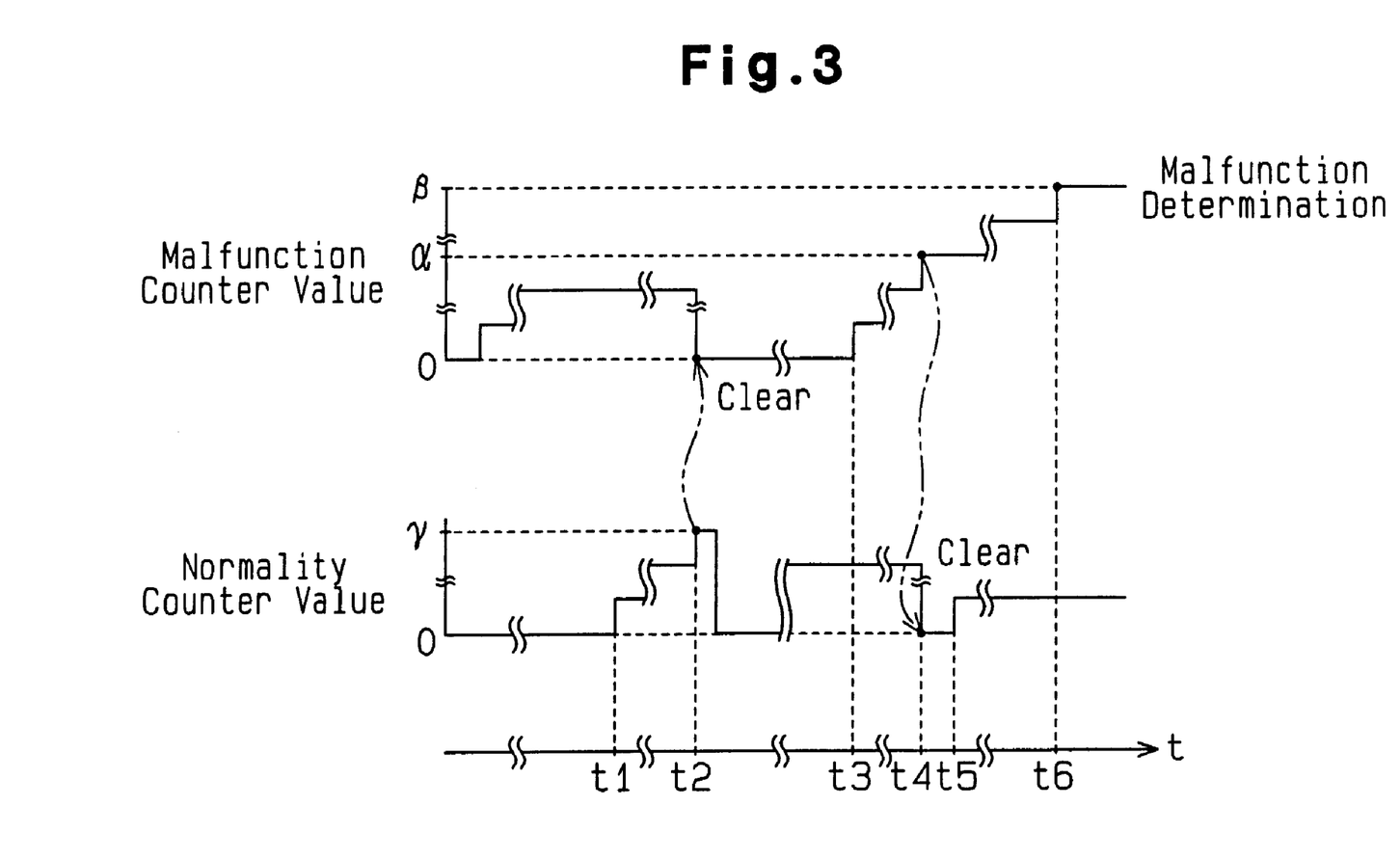
FIG. 3 is a timing chart showing malfunction and normality counter values used in the apparatus of FIG. 1.

Changes of the malfunction counter value and changes of the normality counter value in the malfunction determination routine are shown in the timing chart of FIG. 3. The malfunction counter value is incremented before time t1 in the timing chart. Thereafter, the normality counter value is incremented after time t1. When the normality counter value reaches the value $\gamma$, the malfunction counter value and the normality counter value are reset to zero at time t2. That is, when the accumulated number of times in which the system is determined to be normal reaches a predetermined number, the accumulated number of detected malfunctions is determined to be unreliable and is reset to zero.

When the normality counter value is incremented before time t3 and a malfunction occurs at time t3, the malfunction counter value is incremented and accumulated thereafter. The malfunction counter value reaches the value $\alpha$ at time t4, which resets the normality counter value to zero. That is, the accumulated number of times in which the system is determined to be normal is determined to be unreliable based on detection results indicating malfunction, and the accumulated number of times in which the system is determined to be normal is reset. Thus, if the system is accidentally determined to be normal at time t5, the malfunction counter value is not reset to zero. When the malfunction counter value reaches the predetermined value due to the number of detected malfunctions after time t5, a malfunction is determined at time t6. This determination is not affected by erroneously detected normal state of the system.

The malfunction determining apparatus 100 has the following advantages.

(1) The malfunction counter value, which represents the number of accumulated detected malfunctions, is stored in the standby RAM 140, and the malfunction counter value is maintained when the engine is not running. Therefore, when short trips are repeated, or when only limited number of malfunction test is performed, a malfunction is reliably determined. Further, when the normality counter value is equal to or greater than the value $\gamma$, the CPU 110 determines that the malfunction counter value is unreliable and resets the malfunction counter value. Therefore, a malfunction is determined based on the reliable malfunction counter value. As a result, erroneous determination of a malfunction due to erroneously detected malfunctions is prevented, which improves the accuracy of the malfunction determination. Also, the normality counter value and the malfunction counter value are evaluated based on each other, which improves the accuracy of the malfunction determination.

(2) When the malfunction counter value is equal to or greater than the value $\alpha$, the CPU 110 determines that the normality counter value is unreliable and resets the normality counter value. Therefore, the malfunction counter value is not reset based on the unreliable normality counter value, which improves the accuracy of the malfunction determination.

A malfunction determining apparatus according to a second embodiment of the present invention will now be described. The differences from the first embodiment will mainly be discussed below.

In the first embodiment, if the malfunction counter value reaches the value β in a relatively long trip, a malfunction is determined. However, the determined malfunction may not be reproduced and may be resolved by restarting the engine.

In the second embodiment, the CPU 110 performs a preliminary malfunction determination in a first trip to detect a malfunction. If a malfunction is detected in a second trip, which is later than the first trip, the CPU 110 determines that there is a malfunction in the system 90. Therefore, in the second embodiment, a malfunction that is not reproduced is not detected as a malfunction of the system 90.

The malfunction determination routine according to the second embodiment will now be described with reference to the timing chart of FIG. 4.

Figures 4A, 4H:
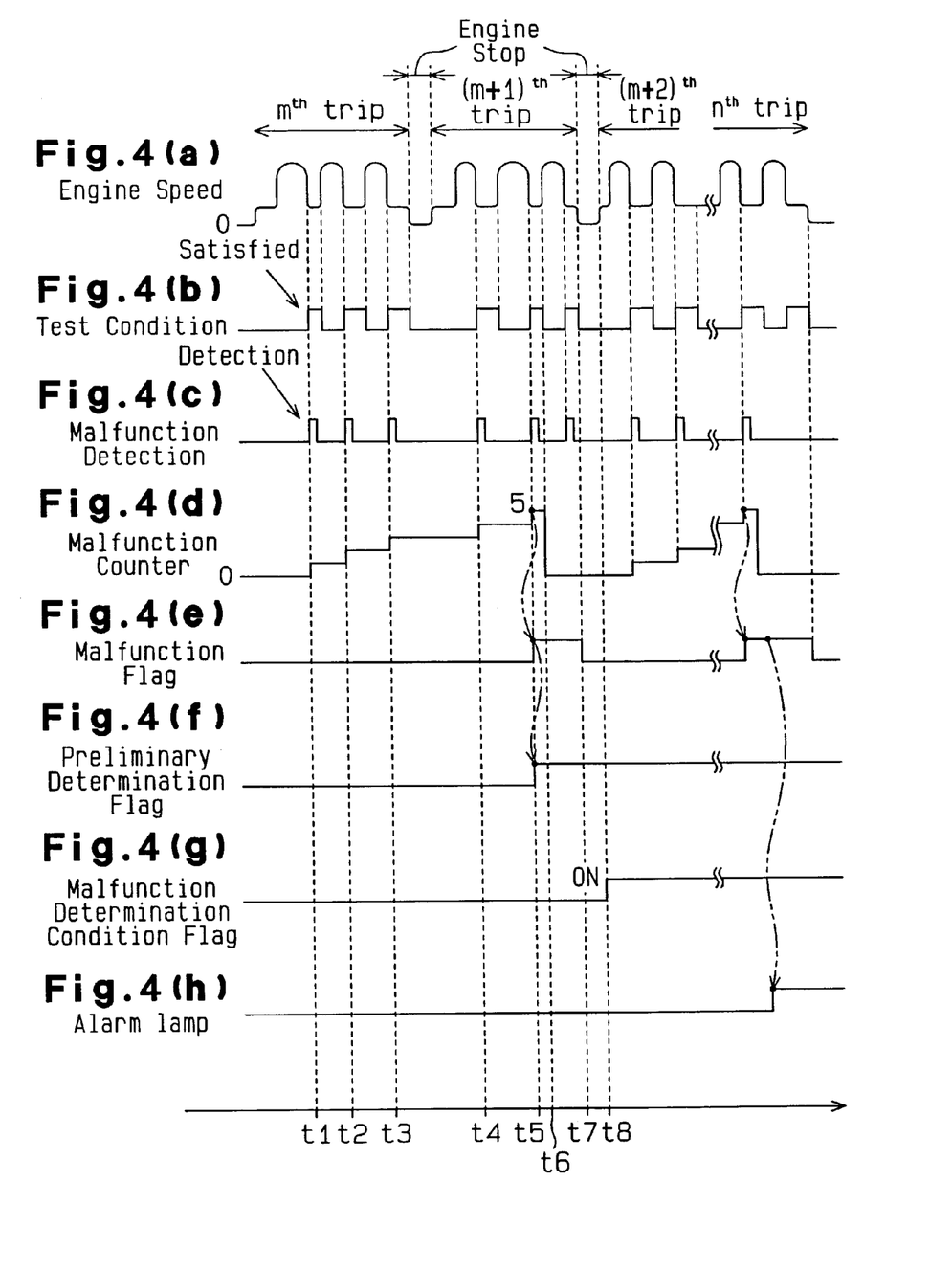
FIG. 4 is a timing chart showing a malfunction determination procedure of a malfunction determining apparatus according to a second embodiment of the present invention.

If the malfunction test condition (FIG. 4(b)) is satisfied in the m$^{th}$ trip, the CPU 110 monitors the difference between the actual engine speed (FIG. 4(a)) and a target engine speed. If the difference is greater than a predetermined value and the actual engine speed is significantly different from the target value, the CPU 110 detects a malfunction (FIG. 4(c)). Every time detecting a malfunction, the CPU 110 increments the malfunction counter value (times t1 to t5 in FIG. 4(d))

If the malfunction counter value reaches a predetermined value (for example, five) in the (m+1)$^{th}$ trip (time t5), the CPU 110 sets a malfunction flag on and stores the malfunction flag in the flag area 131 of the RAM 130. Further, the CPU 110 sets the preliminary malfunction determination flag (FIG. 4(f)) on and stores the preliminary malfunction determination flag in the flag area 143 of the standby RAM 140. The CPU 110 then resets the malfunction counter value to zero (time t6). The preliminary malfunction determination flag represents that there is a malfunction. Thereafter, if a malfunction is detected in the (m+1)$^{th}$ trip, the malfunction counter value is not accumulated. When the (m+1)$^{th}$ trip is finished (time t7), the malfunction flag stored in the normal RAM 130 is erased. In this state, the (m+2)$^{th}$ trip is started (time t8) while the malfunction flag is off.

When the (m+2)$^{th}$ trip is started, the CPU 110 sets a malfunction determining condition flag on (FIG. 4(g)) based on the preliminary malfunction determination flag, which is on. The CPU 110 then stores the malfunction determination condition flag in the flag area 131 of the normal RAM 130. After (m+2)$^{th}$ trip, the CPU 110 increments the malfunction counter value every time a malfunction is detected. When the malfunction counter value reaches the predetermined value (e.g. five) again in the n$^{th}$ trip, the CPU 110 sets the malfunction flag on. When the malfunction flag is on and the malfunction determining condition flag is on, the CPU 110 determines that there is a malfunction in the system 90 and lights the alarm lamp 14 (FIG. 4(h)).

Next, a malfunction determination routine for setting the preliminary malfunction determination flag and the malfunction flag will be described with reference to the flowchart of FIG. 5. The CPU 110 executes the malfunction determination routine of FIG. 5 according to a control program stored in the ROM 120 as an interruption routine every predetermined period.

Figure 2:
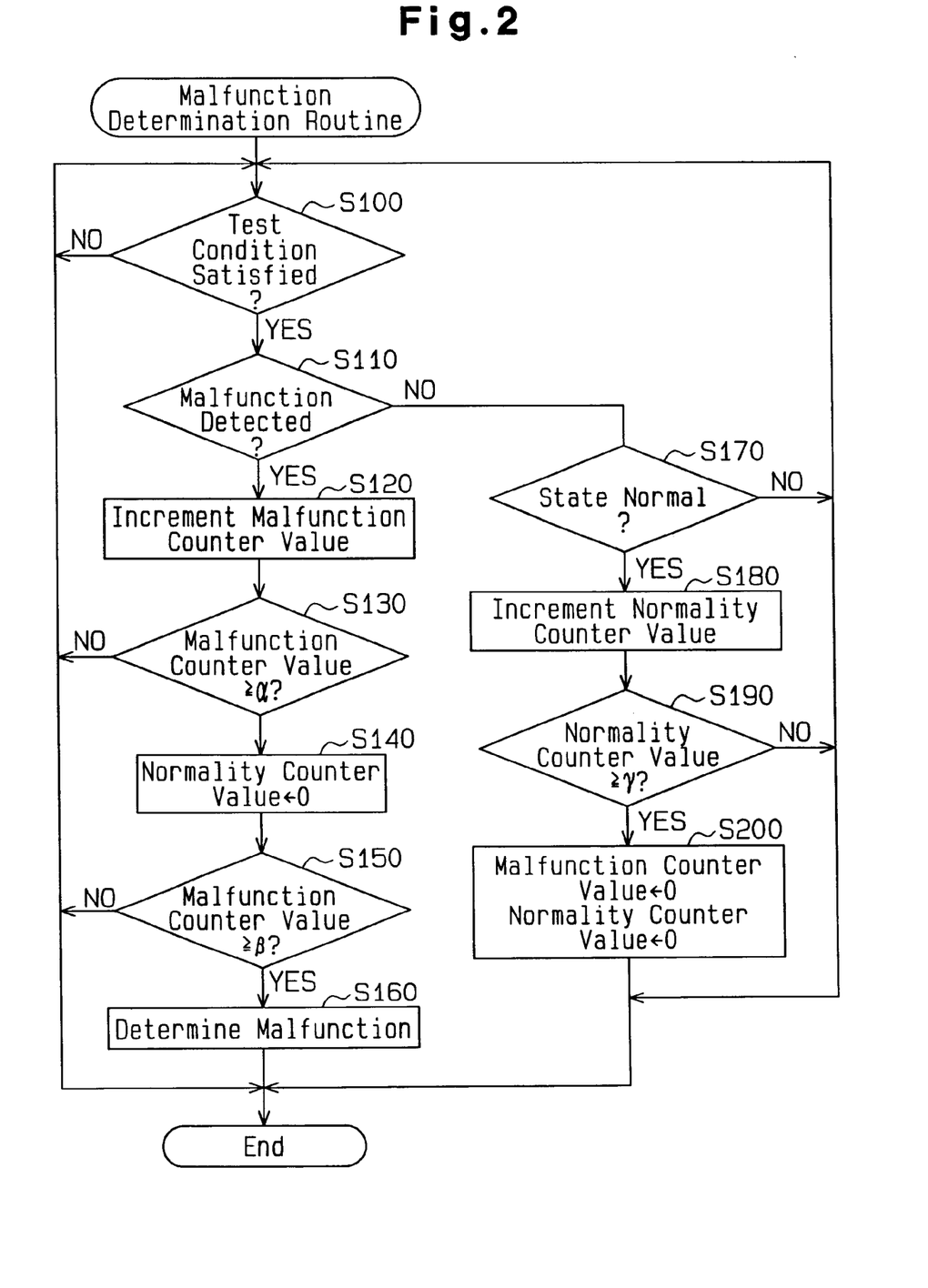
FIG. 2 is a flowchart showing a malfunction determination procedure of the apparatus of FIG. 1.

Like in step S100 of FIG. 2, the CPU 110 determines whether the malfunction test condition is satisfied in step S300.

If the malfunction test condition is satisfied, the CPU 110 proceeds to step S310. Like in step S110 of FIG. 2, the CPU 110 determines whether a malfunction is detected in step S310. If a malfunction is detected, the CPU 110 determines whether the malfunction flag is off in step S320. That is, the CPU 110 determines whether the preliminary malfunction determination has already been executed in the current trip.

If the malfunction flag is off, the CPU 110 increments the malfunction counter value and resets the normality counter value to zero in step S330. Based on the fact that a malfunction is detected in step S310, the CPU 110 determines that the normality counter value is unreliable and resets the normality counter value to zero.

In step S340, the CPU 110 determines whether the malfunction counter value is equal to or greater than a predetermined value ε. Like the value β, the value ε is a threshold value for determining a malfunction. If the malfunction counter value is equal to or greater than the value ε, the CPU 110 proceeds to step S350. In step S350, the CPU 110 sets the malfunction flag and the preliminary malfunction determination flag on, and resets the malfunction counter value to zero. Thereafter, the CPU 110 terminates the routine for setting the preliminary malfunction determination flag and the malfunction flag.

Figure 5:
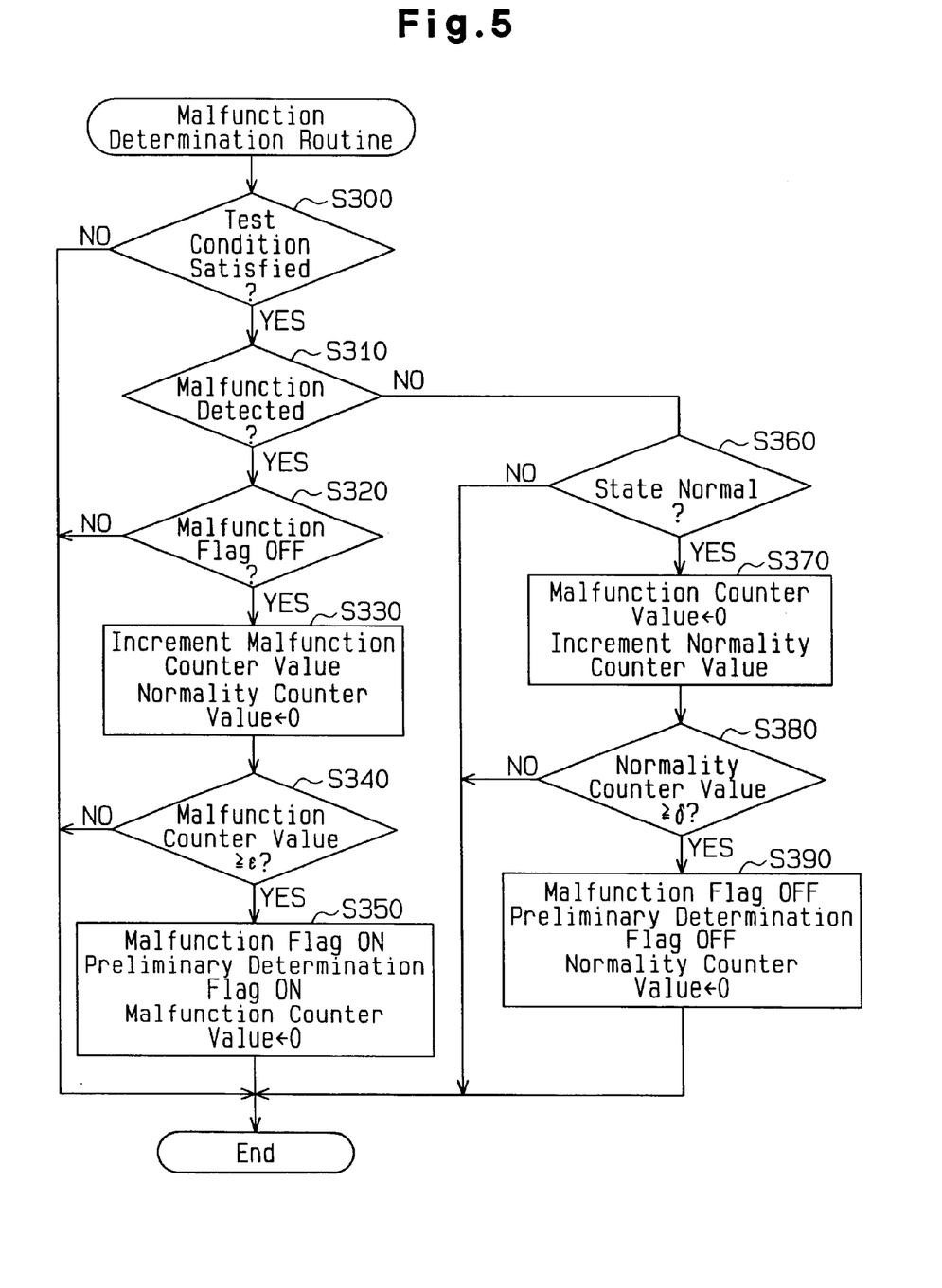
FIG. 5 is a flowchart showing a malfunction test procedure of the apparatus according to the second embodiment.

The CPU 110 terminates the routine of FIG. 5 when the malfunction test condition is not satisfied in step S300, when the malfunction flag is on in step S320 and when the malfunction counter value is less than the value ε in step S340.

If a malfunction is not detected in step S310, the CPU 110 proceeds to step S360. Like in step S170, the CPU 110 determines whether the state of the system is normal in step S360. If the state is normal, the CPU 110 proceeds to step S370. In step S370, the CPU 110 resets the malfunction counter value to zero and increments the normality counter value. The CPU 110 determines that the malfunction counter value is unreliable based on the fact that the state of the system is determined be normal, and resets the malfunction counter value to zero.

In step S380, the CPU 110 determines whether the normality counter value is equal to or greater than a predetermined value δ. If the normality counter value is equal to or greater than the value δ, the CPU 110 proceeds to step S390. In step S390, the CPU 110 sets the malfunction flag and the preliminary malfunction determination flag on, and resets the normality counter value to zero. The CPU 110 determines that the result of the preliminary malfunction determination is unreliable based on the normality counter value and resets the history of the preliminary malfunction determination. In this manner, routine for setting the preliminary malfunction determination flag and the malfunction flag is terminated. The routine is also terminated when the state of the system is not determined to be normal in step S360 and when the normality counter value is less than δ in step S380.

Next, a malfunction determination routine based on the preliminary malfunction determination flag and the malfunction flag will now be described with reference to the flowchart of FIG. 6. The CPU 110 executes the malfunction determination routine of FIG. 6 according to a control program stored in the ROM 120 as an interruption routine every predetermined period.

In step S500, the CPU 110 determines whether the routine is started when the engine is being started. If the routine is started when the engine is being started, the CPU 110 proceeds to step S510. In step S510, the CPU 110 determines whether the preliminary malfunction determination flag is on. If the preliminary malfunction determination flag is on, the CPU 110 proceeds to step S520. In step S520, the CPU 110 sets the malfunction determining condition flag on and stores the malfunction determining condition flag in the flag area 131 of the normal RAM 130. When the preliminary malfunction determination flag is off, the CPU 110 proceeds to step S530. In step S530, the CPU 110 sets the malfunction determining condition flag off and stores the malfunction determining condition flag in the normal RAM 130. In steps S500 to S530, the CPU 110 determines whether there is a history of the preliminary malfunction determination when the engine is being started. If the preliminary malfunction determination flag is on, the malfunction determining condition flag is set to on.

After executing step S520 or step S530, or when the outcome of step S500 is negative, the CPU 110 proceeds to step S540. In step S540, the CPU 110 determines whether the malfunction determining condition flag and the malfunction flag are on. If the malfunction determining condition flag and the malfunction flag are on, the CPU 110 determines that there is a malfunction in the idle control procedure and proceeds to step S550. In step S550, the CPU lights the alarm lamp 14 and thereafter terminates the current routine.

Figure 6:
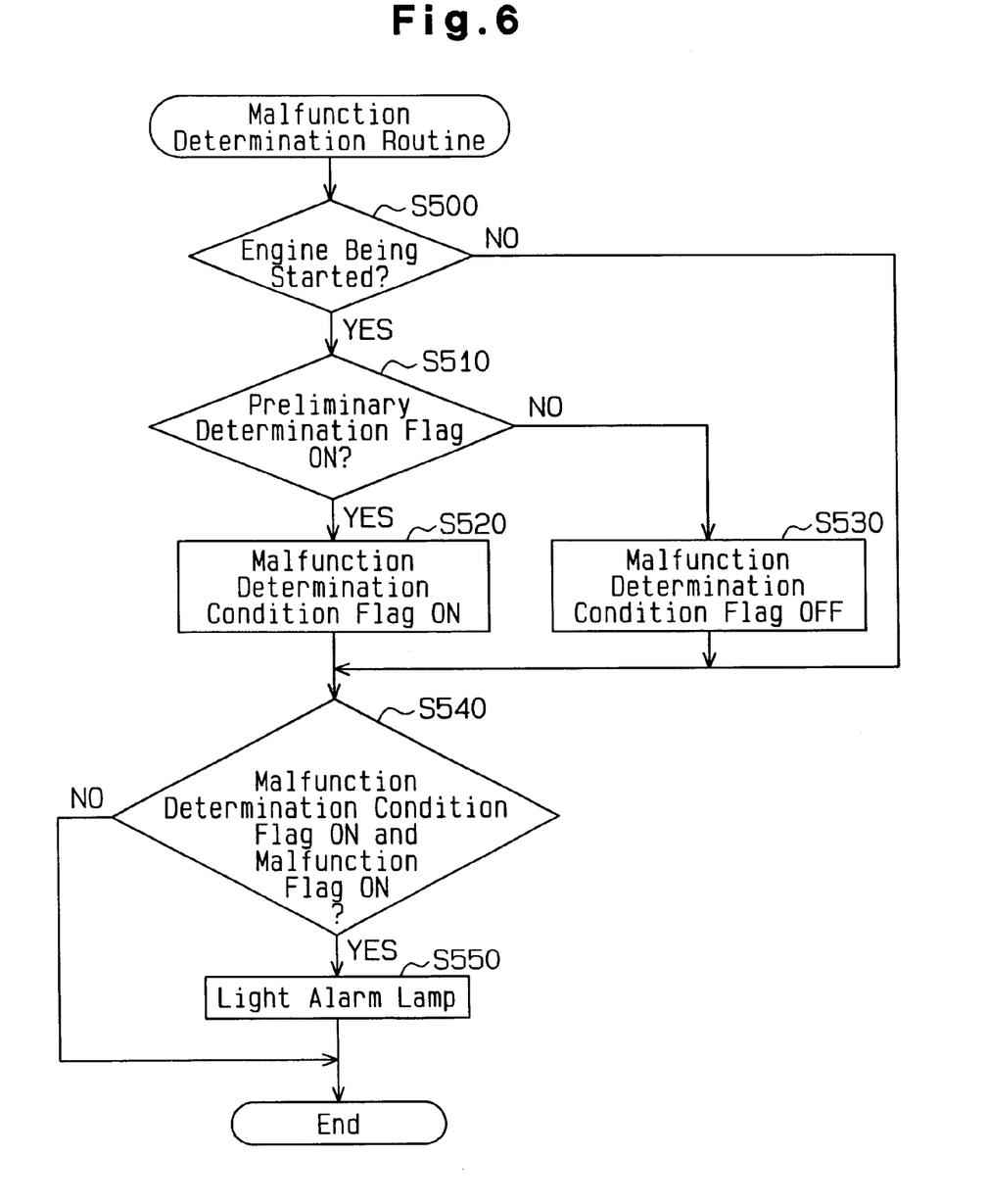
FIG. 6 is a flowchart showing a malfunction determination procedure of the apparatus according to the second embodiment.

The malfunction determination routine of FIG. 6 is also terminated when at least one of the malfunction determining condition flag and the malfunction flag is off in step S540.

The malfunction determining apparatus according to the second embodiment has the following advantages.

If the malfunction counter value reaches the value ε in the first trip, a malfunction is preliminarily determined. In the second trip, which is later than the first trip, a malfunction is determined when the malfunction counter value reaches value ε again. Therefore, a malfunction is resolved by restarting the engine is not detected as a malfunction, which improves the accuracy of the malfunction determination.

A malfunction determining apparatus according to a third embodiment of the present invention will now be described. The differences from the first embodiment will mainly be discussed below.

In a malfunction determination procedure of the third embodiment, the number of the malfunction test is stored in the data area 144 of the standby RAM 140. The CPU 110 evaluates the reliability of the malfunction counter value based on the ratio of the number of detected malfunctions to the number of performed test.

Figure 7:
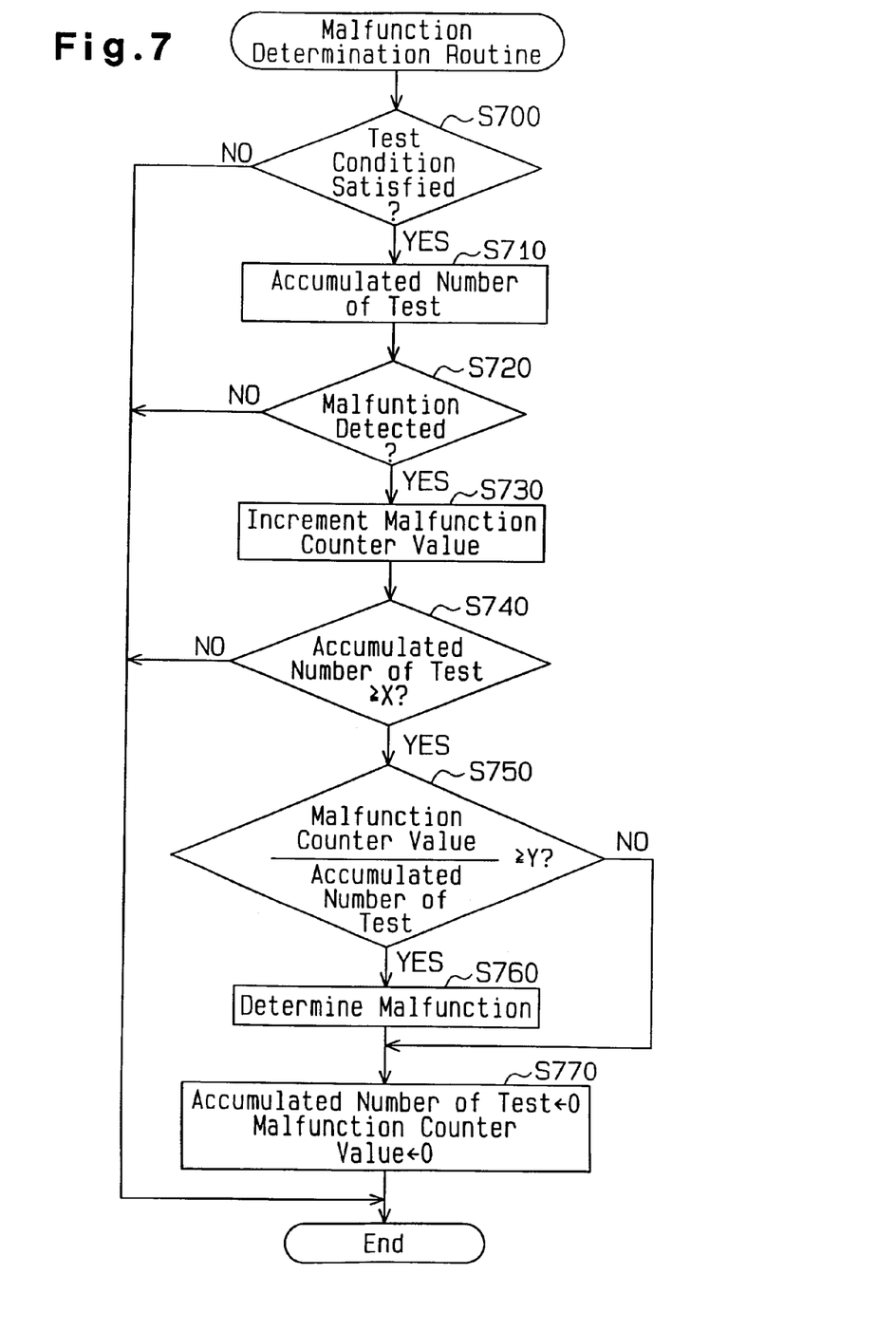
FIG. 7 is a flowchart showing a malfunction determination procedure of an apparatus according to a third embodiment of the present invention.

A malfunction determination routine according to the third embodiment will now be described with reference to the flowchart of FIG. 7. The CPU 110 executes the malfunction determination routine of FIG. 7 according to a control program stored in the ROM 120 as an interruption routine every predetermined period.

Like in step S100 of FIG. 2, the CPU 110 determines whether the malfunction test condition is satisfied in step S700. If the malfunction test condition is satisfied, the CPU 110 proceeds to step S710. In step S710, the CPU 110 increments the number of time of the test and stores the incremented number of the test in the data area 144 of the standby RAM 140.

Like in step S110 of FIG. 2, the CPU 110 determines whether a malfunction is detected. If a malfunction is detected, the CPU 110 proceeds to step S730. In step S730, the CPU 110 increments the malfunction counter value and stores the incremented value in the malfunction counter area 141 of the standby PAM 140.

In steps S740 to S760, the CPU 110 computes the ratio of the number of times of the malfunction test to the malfunction counter value, which represents the number of times when a malfunction is detected. The CPU 110 determines whether there is a malfunction based on the computed ratio. That is, in step S740, the CPU 110 determines whether the number of times of the test is equal to or greater than a predetermined value X. If the number of times of the test is less than the value X, the CPU 110 determines that the number of times of the test is not sufficient for determining a malfunction and terminates the malfunction determination routine. In other words, when the number of times of the test is less than the value X, the CPU 110 determines that a reliable determination cannot be performed even if the ratio of the malfunction counter value to the number of times of the test is sufficiently great, and terminates the malfunction test routine.

If the number of times of the test is equal to or greater than the value X, the CPU 110 determines that the number of times of the test is sufficient for accurately determining a malfunction and proceeds to step S750. In step S750, the CPU 110 computes the ratio of the malfunction counter value to the number of times of the test (the malfunction counter value/the number of times of the test). The CPU 110 determines whether the computed ratio is equal to or greater than a predetermined value Y. If the ratio is equal to or greater than the value Y, the CPU 110 proceeds to step S760. In step S760, the CPU 110 determines that there is a malfunction in the idle speed control and sets the malfunction flag on. That is, when the test is performed for a sufficient number of times and the ratio of the malfunction counter value to the number of times of the test is sufficiently great, the reliability of the malfunction counter is determined to be reliable. The CPU 110 determines a malfunction and lights the alarm lamp 14 based on the malfunction flag, which is on.

After step S760 or when the ratio is less than the value Y in step S750, the CPU 110 proceeds to step S770. In step S770, the CPU 110 resets the number of times of the test and the malfunction counter value to zero. Thereafter, the CPU 110 terminates the malfunction test routine.

The malfunction determining apparatus according to the third embodiment has the following advantages.

(1) The number of times of the test and the malfunction counter value are stored in the standby PAM 140 and maintained when the engine is not running. Therefore, even if the malfunction test is not frequently performed, for example, if short trips are repeated, a malfunction is reliably determined. Further, the number of times of the test is accumulated, and when the ratio of the malfunction counter value to the number of times of the test is equal to or greater than a predetermined value, a malfunction is determined. Therefore, a malfunction is determined while the malfunction counter value is appropriately evaluated. As a result, erroneous determination of a malfunction due to erroneously detected malfunctions is prevented, which improves the accuracy of the malfunction determination.

(2) When the number of times of the test is equal to or greater than a predetermined value, a malfunction is determined based on the ratio of the malfunction counter value to the number of times of the test. Accordingly, the reliability of the malfunction counter value is accurately evaluated while improving the accuracy of the malfunction determination.

It should be apparent to those skilled in the art that the present invention may be embodied in many other specific forms without departing from the spirit or scope of the invention. Particularly, it should be understood that the invention may be embodied in the following forms.

In the second embodiment, the malfunction counter value is reset when the state of the system is determined to be normal in step S360. However, the malfunction counter value may be reset when the normality counter value reaches a predetermined value. Also, the normality counter value may be reset when the malfunction counter value reaches a predetermined value.

In the second embodiment, the alarm lamp 14 is lit when the malfunction determining condition flag and the malfunction flag are on in step S540 of FIG. 6. Thereafter, the alarm lamp 14 may be continuously lit even if the flags are set off. Also, the number of times that the normality counter value reaches the value δ may be stored and the alarm lamp 14 may be turned off when the stored number reaches a predetermined value.

In the second embodiment, the malfunction counter value is not incremented when the preliminary malfunction determination is performed in the same trip. For example, once the preliminary malfunction determination is performed, step S300 and subsequent steps of FIG. 5 need not be executed in the same trip. Also, after increment of the malfunction counter value is prohibited for a predetermined period, the malfunction counter value may start being incremented in the same trip.

Once the preliminary malfunction determination is performed, increment of the malfunction counter value may be prohibited until the engine is started again from a cold state. In this case, a malfunction that occurs only during a warming up cycle, in which the engine is stopped for a short period, and is not reproduced is not determined.

In the second embodiment, the reliability evaluations need not be performed. Specifically, the malfunction counter value need not be reset when the system is determined to be normal, the normality counter value need not be reset when a malfunction is detected, and the preliminary malfunction determination flag need not be set off when the number of times that the system is determined to be normal reaches the value δ. Instead, increment of the malfunction counter value may be prohibited for a predetermined period after the preliminary malfunction determination.

In the first and second embodiments, the normality counter value stored in the standby RAM 140 is used for evaluating the reliability of the malfunction counter value stored in the standby RAM 140. For example, the normality counter value may be stored in the normal RAM 130. Instead of the normality counter value, the accumulated number of times when the system is determined to be normal may be used for evaluating the malfunction counter value. In this case, the malfunction counter value may be reset when the accumulated time in a single idling reaches a predetermined value.

In the third embodiment, the number of times of test is incremented every time the test condition is satisfied. However, as in steps S110 and step S170 of FIG. 2, a process for detecting malfunction and a process for determining whether the state of the system is normal may be executed, and the number of increment of the malfunction counter value in step S120 of FIG. 2 or the number of increment of the normality counter value in step S180 of FIG. 2 may be accumulated.

In the third embodiment, when the malfunction counter value reaches a predetermined value, whether the number of times of the test has reached a predetermined value may be determined and, if the number of times of the test has reached the predetermined value, a malfunction may be determined.

In the first to third embodiments, the malfunction determination routine is an interruption. However, the time to start the malfunction determination routine may be changed. For example, the malfunction determination routine may be started when a signal indicating that the throttle valve is fully closed is sent to the ECU 100. In other words, when a device that detects the state of the engine system supplies an interruption signal to the ECU 100, the malfunction determination routine may be started.

In the first to third embodiments, a malfunction is detected based on the difference between the target engine speed and the actual engine speed when the engine has been idling for a predetermined period. However, malfunction may be detected in different manners.

The first to third embodiments may be applied to a malfunction determining apparatus other than the malfunction determining apparatus for idle speed control. For example, the present invention may be applied to a malfunction determining apparatus for a secondary air supply apparatus, a catalytic converter and an apparatus that performs EGR by the engine load. That is, the present invention is particularly effective when applied to an apparatus in which a test condition is satisfied in relatively limited running state.

Therefore, the present examples and embodiments are to be considered as illustrative and not restrictive and the invention is not to be limited to the details given herein, but may be modified within the scope and equivalence of the appended claims.

What is claimed is:

1. An apparatus for determining the state of an engine system, comprising:
    a processing unit, wherein the processing unit includes:
        detecting means, wherein the detecting means detects whether there is a malfunction in the engine system every time a predetermined condition is satisfied;
        first counter means, wherein the first counter means generates a first counter value by counting the number of times when the detecting means detects a malfunction;
        second counter means, wherein the second counter means generates a second counter value for evaluating the reliability of the first counter value; and
    a memory, which is connected to the processing unit, wherein the memory stores the first and second counter values regardless of whether the engine is stopped;
    wherein the processing unit further includes determining means, wherein the determining means evaluates the reliability of the first counter value based on the second counter value, wherein, when the first counter value is reliable and reaches a predetermined value, the determining means determines that there is a malfunction in the engine system.

2. The apparatus according to claim 1, wherein the second counter value represents the number of times of a test for the engine system performed by the processing unit;
    wherein the determining means computes the ratio of the first counter value to the second counter value, wherein, when the ratio is equal to or greater than a second predetermined value, the determining means determines that the first counter value is reliable and determines whether there is a malfunction in the engine system.

3. The apparatus according to claim 1, wherein, when the first counter value reaches the predetermined value, the determining means preliminarily determines that there is a malfunction in the engine system and resets the first counter value, and wherein, when the first counter value reaches the predetermined value again after the preliminary determination, the determining means determines that there is a malfunction in the engine system.

4. The apparatus according to claim 1, wherein the apparatus is used to determine whether there is a malfunction in the engine system in idle speed control of the engine system, and wherein the predetermined condition includes a condition whether a predetermined period has elapsed after the idle speed control is started.

5. An apparatus for determining the state of an engine system, comprising:
a processing unit, wherein the processing unit includes:
malfunction detecting means, wherein the malfunction detecting means detects whether there is a malfunction in the engine system every time a predetermined condition is satisfied;
first counter means, wherein the first counter means generates a first counter value by counting the number of times when the malfunction detecting means detects a malfunction;
normality detecting means, wherein the normality detecting means detects whether the state of the engine system is normal every time a predetermined condition is satisfied; and
determining means, wherein the determining means evaluates the reliability of the first counter value based on the detection result of the normality detecting means, wherein, when the first counter value is reliable and reaches a first predetermined value, the determining means determines that there is a malfunction in the engine system.

6. The apparatus according to claim 5, wherein the processing unit further includes:
second counter means, wherein the second counter means generates a second counter value by counting the number of times when the normality detecting means detects that the state of the engine system is normal; and
reset means, wherein, when the second counter value reaches a second predetermined value, the reset means resets the first counter value.

7. The apparatus according to claim 6, further comprising a memory, which is connected to the processing unit, wherein the memory stores the first and second counter values regardless of whether the engine is stopped.

8. The apparatus according to claim 5, wherein, when the first counter value reaches the first predetermined value, the determining means preliminarily determines that there is a malfunction in the engine system and resets the first counter value, and wherein, when the first counter value reaches the first predetermined value again after the preliminary determination, the determining means determines that there is a malfunction in the engine system.

9. An apparatus for determining the state of an engine system, comprising:
a processing unit, wherein the processing unit includes:
detecting means, wherein the detecting means detects whether there is a malfunction in the engine system every time a predetermined condition is satisfied;
counter means, wherein the counter means generates a counter value by counting the number of times when the detecting means detects a malfunction;
preliminary determining means, wherein, when the counter value reaches a predetermined value, the preliminary determining means preliminarily determines that there is a malfunction in the engine system and generates preliminary determination information; and
a memory, which is connected to the processing unit,
wherein the memory stores the counter value and the preliminary determination information regardless of whether the engine is stopped;
wherein the processing unit further includes:
reset means, wherein, when it is preliminarily determined that there is a malfunction in the engine system, the reset means resets the counter value;
prohibiting means, wherein the prohibiting means prohibits the counter means from counting for a predetermined period after the preliminary determination; and
malfunction determining means, wherein, when the counter value reaches the predetermined value again, the malfunction determining means determines that there is a malfunction in the engine system.

10. The apparatus according to claim 9, wherein the predetermined period includes a period from when the preliminary determination is made to when the engine is subsequently started after being cooled.

11. A method for determining the state of an engine system, comprising:
detecting whether there is a malfunction in the engine system every time a predetermined condition is satisfied;
generating a first counter value by counting the number of times when a malfunction is detected in the detecting step;
generating a second counter value for evaluating the reliability of the first counter value;
storing the first and second counter values in a memory, wherein the memory maintains the first and second counter values regardless of whether the engine is stopped;
evaluating the reliability of the first counter value based on the second counter value; and
determining that there is a malfunction in the engine system when the first counter value is reliable and reaches a predetermined value.

12. The method according to claim 11, wherein the second counter value represents the number of performed times of a test for the engine system;
wherein evaluating includes:
computing the ratio of the first counter value to the second counter value
determining that the first counter value is reliable when the ratio is equal to or greater than a second predetermined value.

13. The method according to claim 11, wherein determining includes:
preliminarily determining that there is a malfunction in the engine system when the first counter value reaches the predetermined value;
resetting the first counter value based on the preliminary determination; and
determining that there is a malfunction in the engine system when the first counter value reaches the predetermined value again after the preliminary determination.

14. The method according to claim 11, wherein the method is applied to an apparatus that determines whether there is a malfunction in the engine system in idle speed control of the engine system, and wherein the predetermined condition includes a condition whether a predetermined period has elapsed after idle speed control is started.

15. A method for determining the state of an engine system, comprising:

detecting whether there is a malfunction in the engine system every time a predetermined condition is satisfied;

generating a first counter value by counting the number of times when a malfunction is detected in the detecting step;

detecting whether the state of the engine system is normal every time a predetermined condition is satisfied;

evaluating the reliability of the first counter value based on the detection result of the normality detecting step; and determining that there is a malfunction in the engine system when the first counter value is reliable and reaches a first predetermined value.

16. The method according to claim 15, further comprising:

generating a second counter value by counting the number of times when the state of the engine system is detected to be normal; and resetting the first counter value when the second counter value reaches a second predetermined value.

17. The method according to claim 16, further comprising storing the first and second counter values in a memory, wherein the memory maintains the first and second counter values regardless of whether the engine is stopped.

18. The method according to claim 15, wherein the determining step includes:

preliminarily determining that there is a malfunction in the engine system when the first counter value reaches the predetermined value;

resetting the first counter value based on the preliminarily determination result; and determining that there is a malfunction in the engine system when the first counter value reaches the predetermined value again after the preliminary determination.

19. A method for determining the state of an engine system, comprising:

detecting whether there is a malfunction in the engine system every time a predetermined condition is satisfied;

generating a counter value by counting the number of times when a malfunction is detected in the detecting step;

preliminarily determining that there is a malfunction in the engine system when the counter value reaches a predetermined value and generating preliminary determination information;

storing the counter value and the preliminary determination information in a memory, wherein the memory maintains the counter value and the preliminary determination information regardless of whether the engine is stopped;

resetting the counter value when it is preliminarily determined that there is a malfunction in the engine system;

prohibiting the counter value from being generated for a predetermined period after the preliminary determination; and determining that there is a malfunction in the engine system when the counter value reaches the predetermined value again.

20. The method according to claim 19, wherein the predetermined period includes a period from when the preliminary determination is made to when the engine is subsequently started after being cooled.

\* \* \* \* \*